(12) United States Patent
Poirier

(10) Patent No.: US 9,558,746 B1
(45) Date of Patent: *Jan. 31, 2017

(54) LARGE VOCABULARY BINARY SPEECH RECOGNITION

(71) Applicant: Darrell Poirier, Woodstock, CT (US)

(72) Inventor: Darrell Poirier, Woodstock, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,636

(22) Filed: Sep. 30, 2014

Related U.S. Application Data

(63) Continuation-in-part of application No. 14/469,335, filed on Aug. 26, 2014, now abandoned, which is a continuation-in-part of application No. 14/467,026, filed on Aug. 24, 2014, now abandoned, which is a continuation of application No. 12/785,984, filed on May 24, 2010, now Pat. No. 8,818,807.

(60) Provisional application No. 61/182,663, filed on May 29, 2009.

(51) Int. Cl.
*G10L 15/00* (2013.01)
*G10L 21/00* (2013.01)
*G10L 15/26* (2006.01)

(52) U.S. Cl.
CPC ..................... *G10L 15/26* (2013.01)

(58) Field of Classification Search
CPC .......... B66B 3/00; B66B 3/008; B66B 1/3415; G10L 15/00; G10L 15/22
USPC ................................... 704/235, 278
See application file for complete search history.

(56) References Cited

U.S. PATENT DOCUMENTS

2002/0069073 A1* 6/2002 Fasciano .................. 704/278

* cited by examiner

*Primary Examiner* — Charlotte M Baker
(74) *Attorney, Agent, or Firm* — Gerry A. Blodgett; David J. Blodgett; Blodgett & Blodgett, P.C.

(57) ABSTRACT

This invention describes methods for implementing human speech recognition. The methods described here are of using sub-events that are sounds between spaces (typically a fully spoken word) that is then compared with a library of sub-events. All sub-events are packaged with it's own speech recognition function as individual units. This invention illustrates how this model can be used as a Large Vocabulary Speech Recognition System.

17 Claims, 7 Drawing Sheets

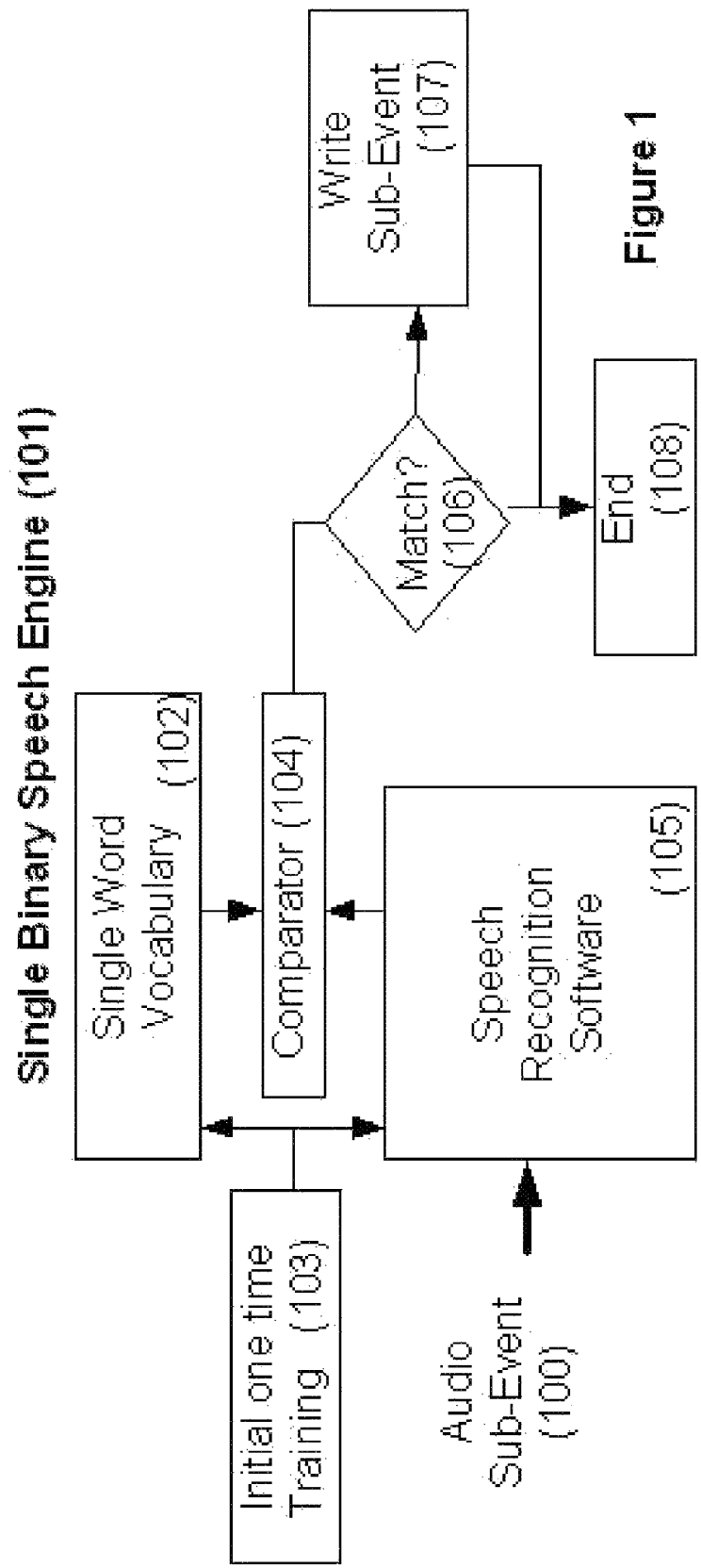

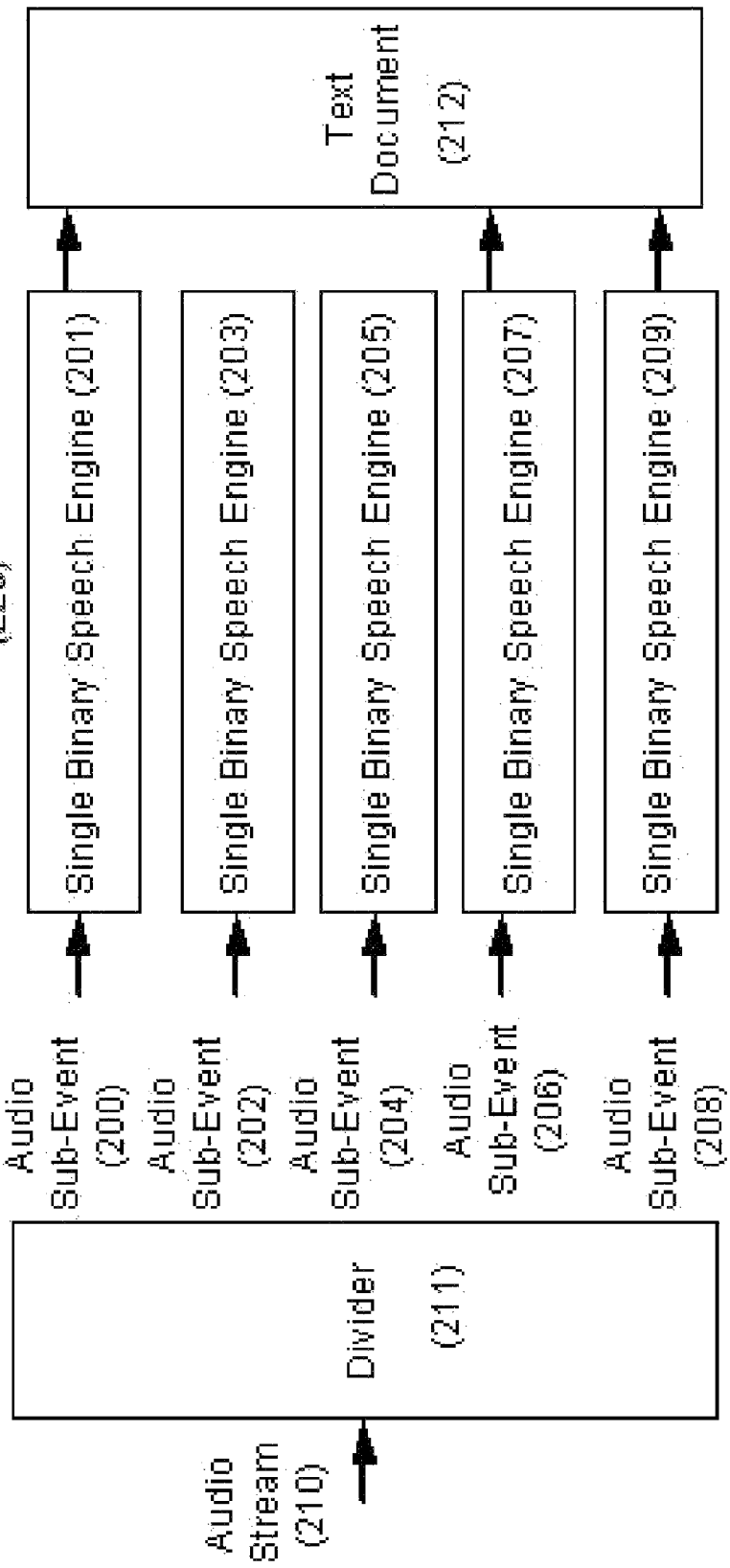

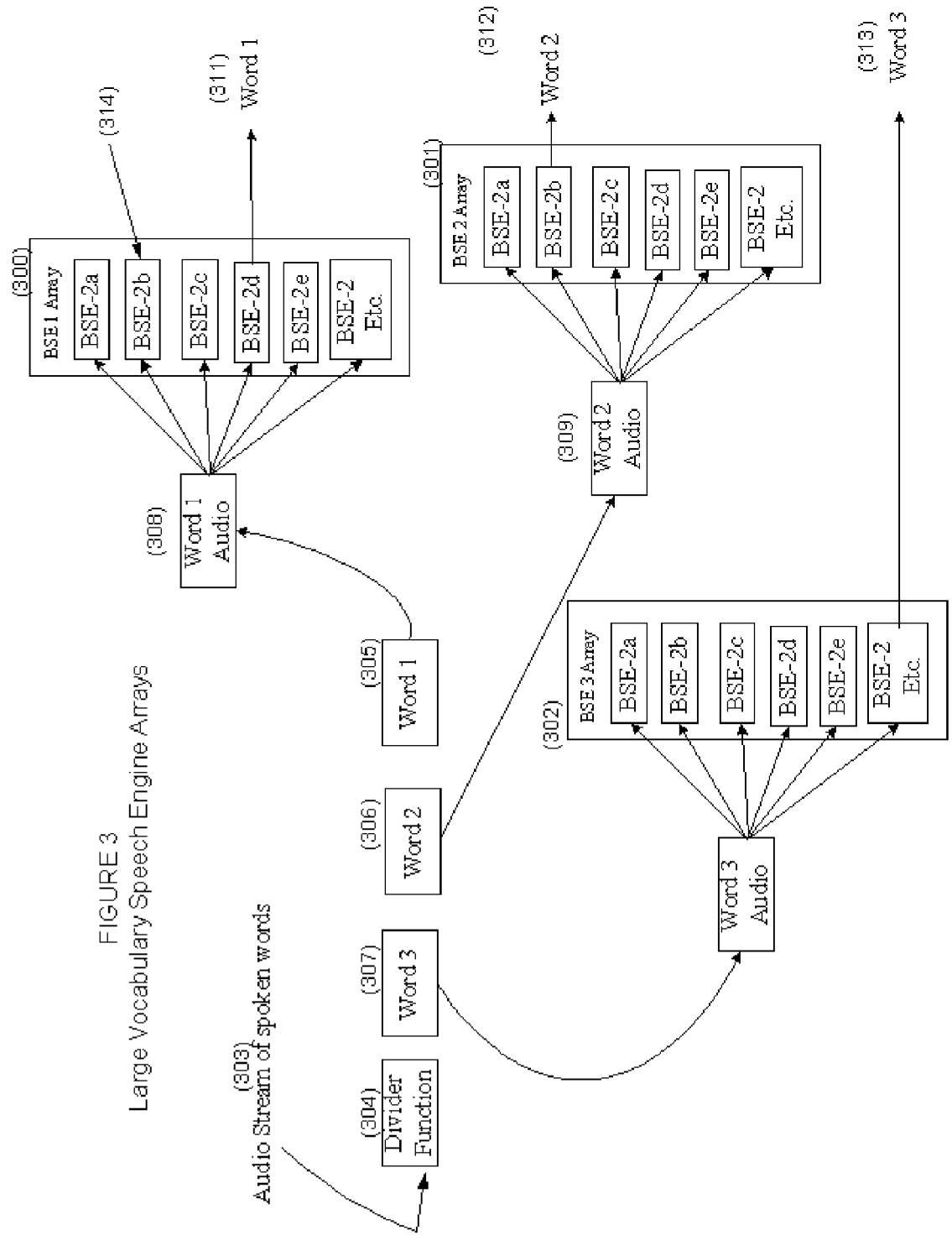

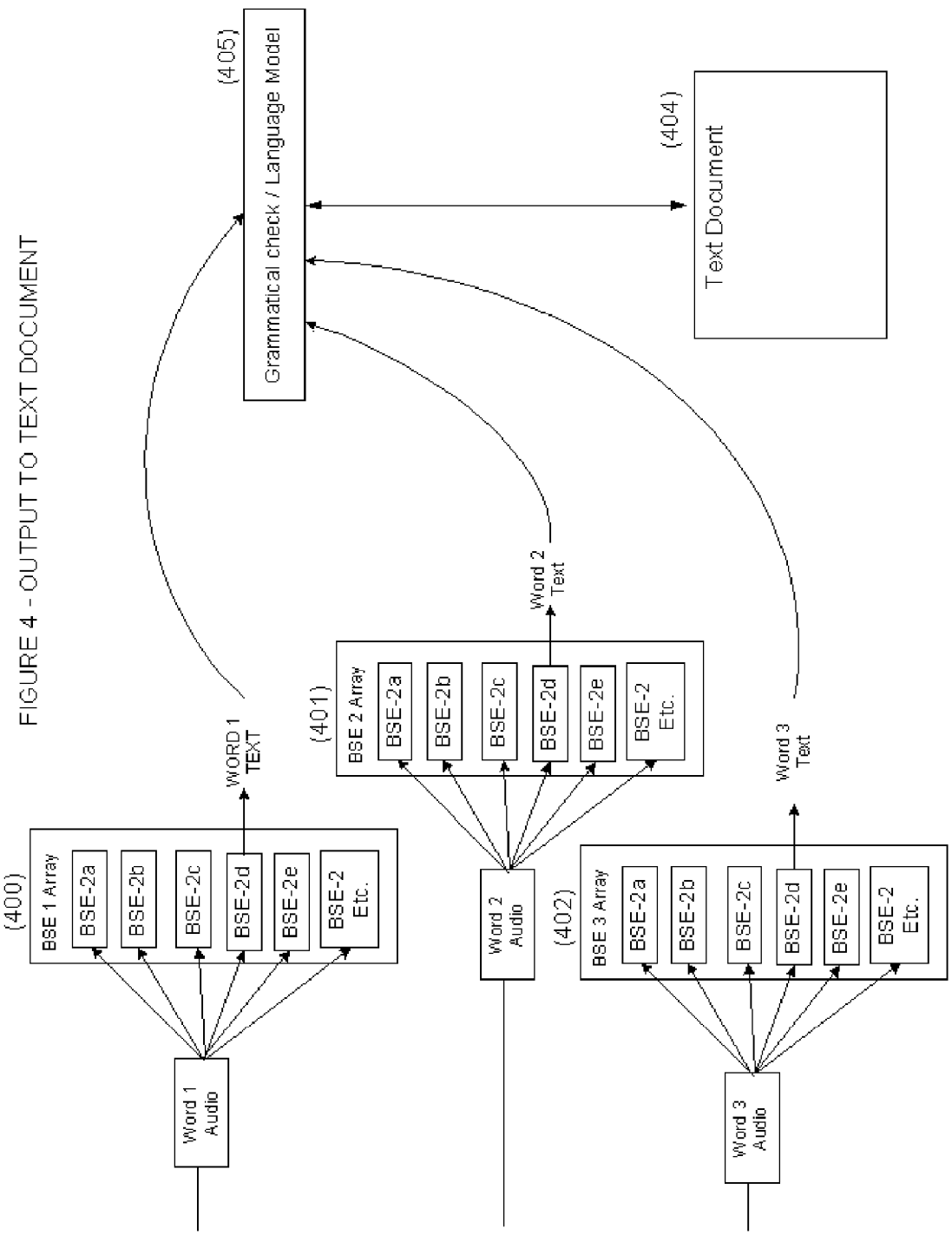

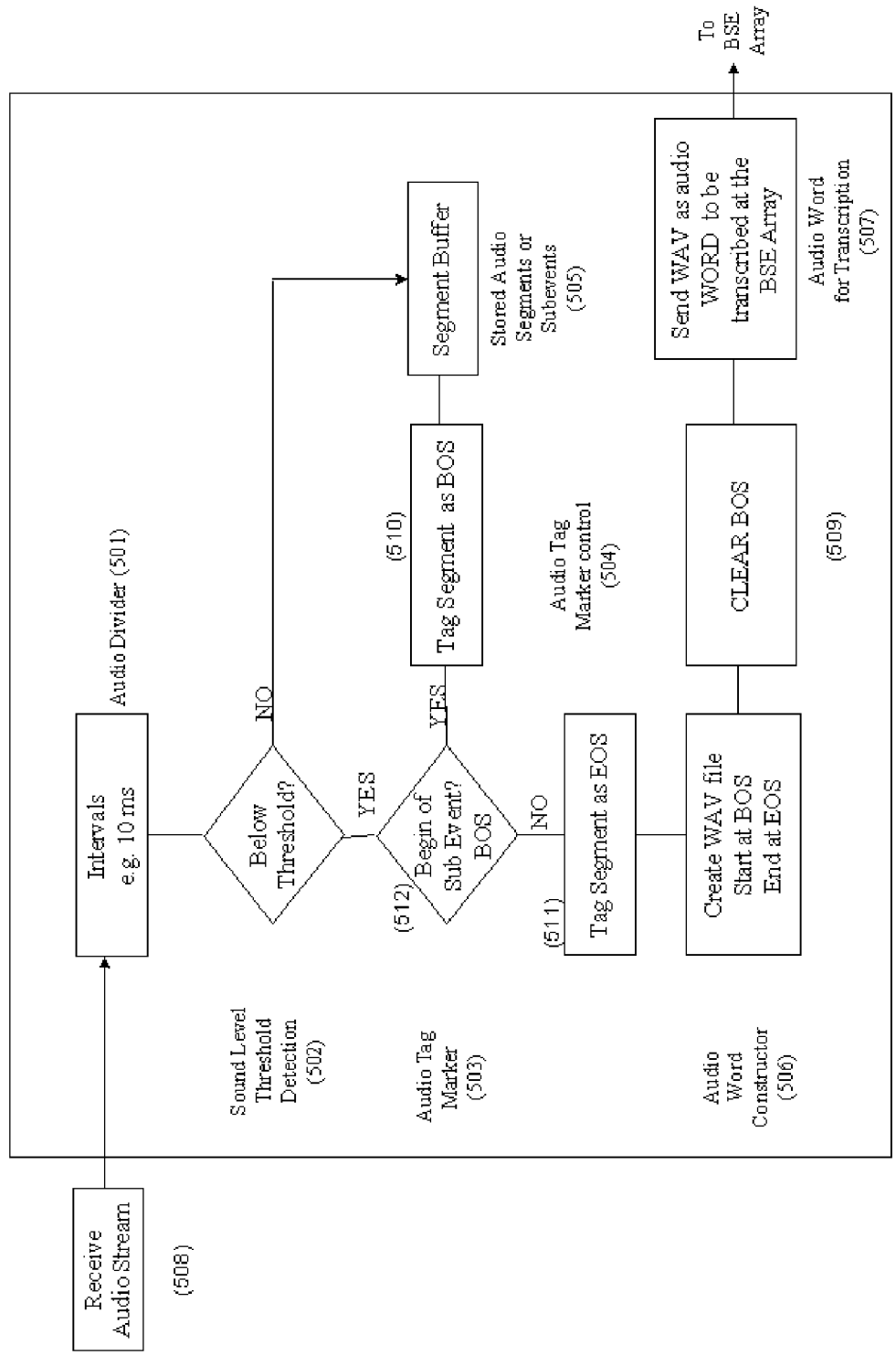

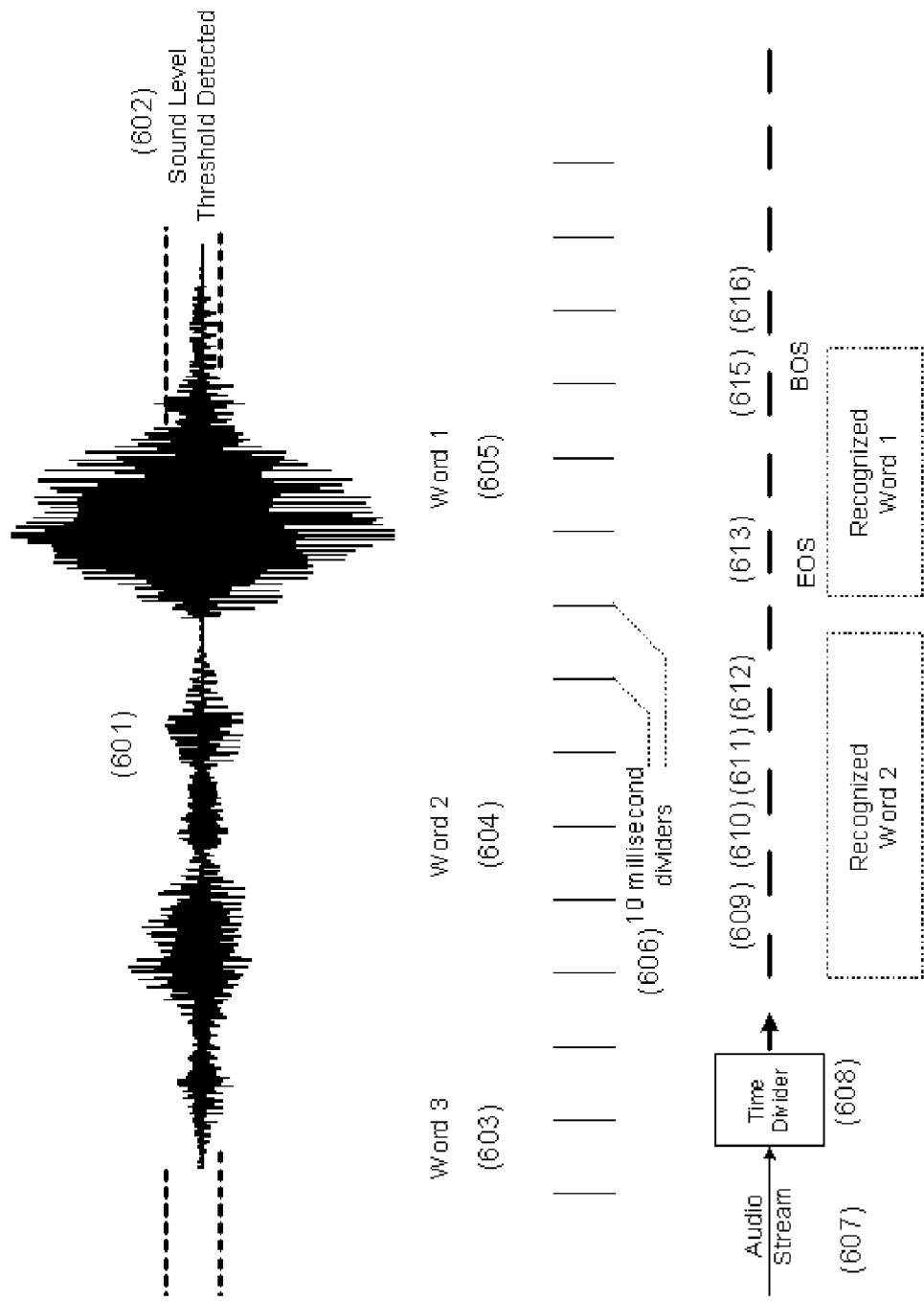

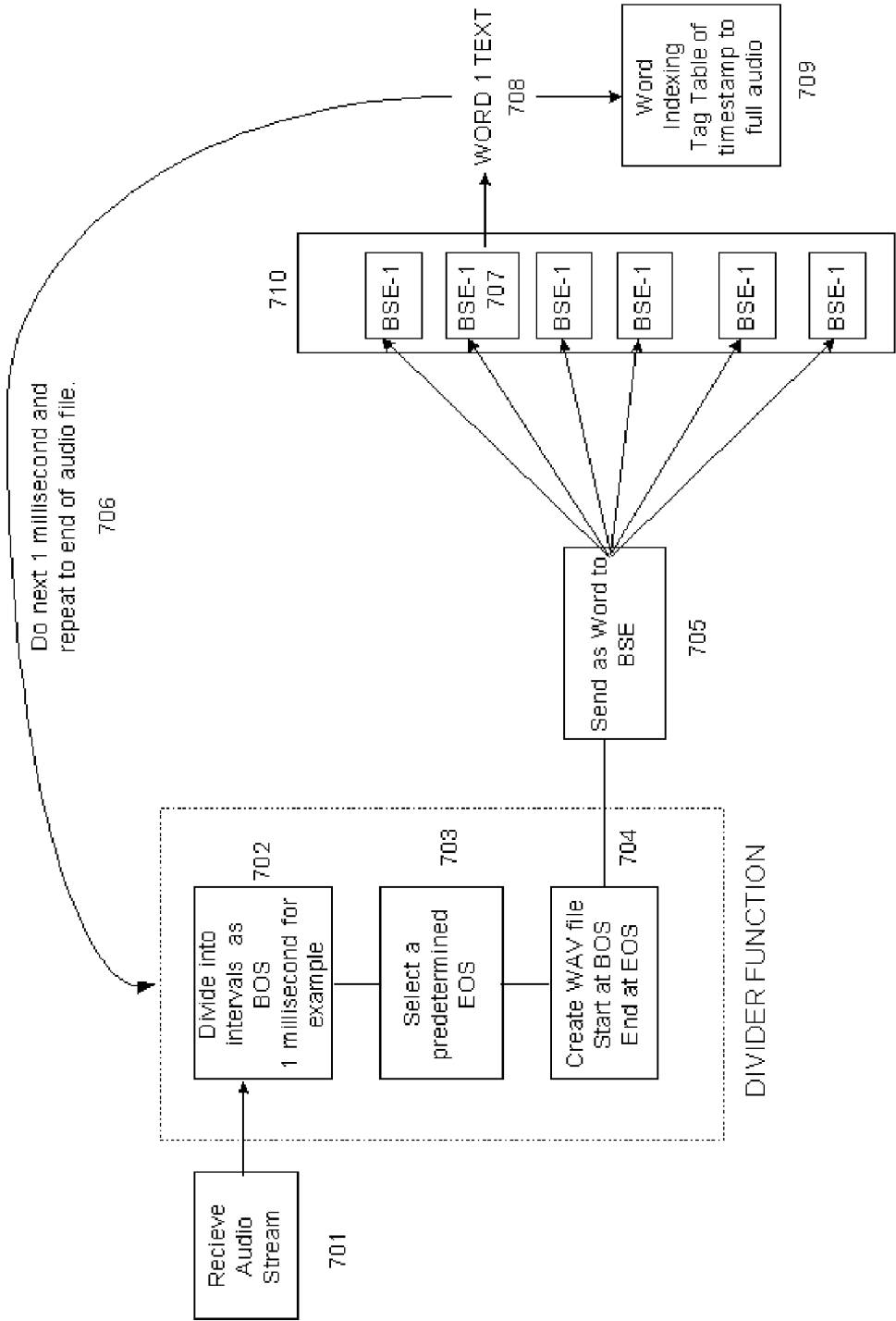

LARGE VOCABULARY BINARY SPEECH RECOGNITION

FIELD OF THE INVENTION

This invention relates to the field of speech recognition computer software and proposes a new process for converting audio speech into text.

SUMMARY

This invention describes a method for implementing human speech recognition. Typical speech recognition systems use a method of examining phonemes combined with Hidden Marchov Models (HMM) to translate audio into text or related word commands. Alternatively, another method uses pattern recognition which is more common with back propagation with neural nets.

The methods described here are of using sub-events that are sounds between spaces (typically a fully spoken word) that is then compared with a library of sub-events. All sub-events are packaged with it's own speech recognition function as individual units. This invention illustrates how this model can be used as a Large Vocabulary Speech Recognition System.

Problem to be Solved

In the present speech transcription industry there are three methods of implementing large vocabulary speech recognition. The three methods include: Human Transcription, Speech Recognition software, and a combination of Human and Speech Recognition software. These methods present some problems including:

Price

As is well recognized, using human labor is expensive for mass production of transcribing text documents of large amounts of audio. Billions of dollars are spent each year on this process. Speech recognition software is relatively expensive due to minimal competition of the speech recognition software and the relative licensing fees. There is open source software which is inexpensive or free to use, however at present this software is technically far behind what the commercial packages deliver for accuracy and performance and the models used are similar.

Training

Another well known disadvantage is that large vocabulary speech recognition needs training and in most cases it needs to be trained to a specific user for best results.

Technology

There are two common methodologies used for speech recognition. There are small vocabularies that provide a high accuracy rate, and large vocabularies with lower word accuracies. The typical methods use the underlying technologies of Dynamic Time Warping and/or Hidden Marchov Models (HMM). Low vocabulary models have higher accuracy rates due to the few choices of words that the speech engine needs to determine, for example 20 words or a single phrase is more likely to be correctly identified versus picking a phrase out of a 100,000 word list. A method of increasing the accuracy for the large vocabulary is to attach contextual and grammatical models that anticipate by a high percentage what the next word will likely be. In the end, 100% accuracy remains a problem for speech recognition systems still at the present time.

Industry Trends

Trends with technologies typically start high priced and then prices are reduced over time as the technology becomes less expensive due to lower manufacturing cost, higher volumes, and the most common reason is competition. For large vocabulary speech recognition engines competition low has been low allowing prices to remain higher. In comparison using telecommunications as an example, it has been demonstrated that competition can reduce prices by orders of magnitude. Consumer phone usage bills dropped from approximately $125 per month for land lines, to $30 per month for Voice over IP services, to $1.60 per month ($20 per year) with Internet based services. If a similar model of competition could be implemented in speech recognition industry then similar results should occur. It is one goal of this invention to bring additional competition to the large vocabulary speech recognition market and reduce prices for end users.

OVERVIEW OF THE INVENTION

The Speech Recognition Software

Speech Engine

This invention proposes combining the low vocabulary and the large vocabulary models into a binary selection multi-process speech engine, meaning that when a human is speaking, each word or a single phrase is separated out into a sub-event and processed. The Binary Speech Recognition software has a total vocabulary of a single word or phrase. When a separate sub-event is delivered to the Binary Speech Recognition software, a binary determination is made, Match or No Match or "true" or "false".

Large Vocabulary Processing

To process dictation or conversations of large vocabularies the single word vocabulary model can be reproduced for each word in the desired vocabulary. For example if a vocabulary of 60,000 words is needed, then 60,000 speech engines with single word vocabularies can be used. If contextual and grammatical models are applied then vocabularies could be dynamic based on the contextual thread reducing the number of Binary Speech Engine processes that need to be launched.

Advantages

There are some clear advantages of the Large Vocabulary Binary Speech Recognition processing model including: parallel processing reducing transcription turn around time, Binary Speech Engines can be constructed from Open Source Software that is readily available, Open Source Software is less expensive than commercial software allowing cost reductions, training is not needed beyond the initial development of each Binary Speech Engine, this process could lend itself to be implemented in hardware more easily, for example implementation of a single word in a hardware neural net.

DETAILED DESCRIPTION OF THE INVENTION

Referring to FIG. 1, which is a single Binary Speech Engine, there are 4 components and 3 process steps that the components execute. The components include: A single word vocabulary (102), Speech Recognition Software (105), a Comparator (104), and a Sub-Event Writer (107).

The process of creating the Single Binary Speech Engine includes: Launching the Speech Engine as a computer software process (105), Load the Single Word Vocabulary (102) previously trained (103).

1) Input the Sub-Event Audio Stream (100) into the Speech Recognition Software (105).
2) Using the Comparator (104), the Audio Sub-Event (100) is compared with the Single Word Vocabulary (102)
3) A true or false decision is determined using Match (106).
4) If the Match is true, the Sub-Event Writer (107) writes the sub-event into a text document or some other desired output to perform a desired response.
5) Then the Binary Speech Engine process Ends (108).
6) If the Match is false then the Binary Speech Engine process Ends (108) without writing results.

FIG. 2 illustrates many Single Binary Speech Engines parallel processing speech audio stream.

1) The Audio Stream (210) is input into a Divider (211) where the audio stream is divided up into Audio Sub-Events (200, 202, 204, 206, 208).
2) Each Audio Sub-Event is input into an array of Single Binary Speech Engines (201, 203, 205, 207, 209).
3) If a match is true then the word is written to the Text Document (212) and that Sub-Event is removed from further processing in the speech engine array.

If a sub-event tag of some type (I.E. an index of sub-event ordering) is added, then it's not important of waiting for a specific sub-event to complete. Each sub-event could complete as quickly as possible freeing up the binary speech engine to the next available sub-event. Then after all sub-events have completed, the document could be constructed.

While this method may be desirable for some workloads, the option still remains for sequential processing of sub-events allowing the document to be constructed as each word or phrase as identified.

Alternative Implementation Methods for Single Binary Speech Engines

Using the binary model for implementing speech recognition engines allows alternative models of processing to become available including neural net models and pattern recognition software.

Neural Networks

Neural net technology had become an alternative concept with regards to computational models versus the traditional von-Neumann architecture processing approach. In the 1980's experiments using Artificial Neural Networks (ANN) illustrated that an ANN could be trained with a desired input and could produce a true or false output when comparing the trained input with a separate input.

A typical method of implementation for a neural net is to have a database of samples for training the neural net. A learning algorithm is used to train the neural net where each sample results in calculated weighted values that are applied to the various nodes at the relevant layers in the network.

Neural networks have been applied to the task of speech recognition for decades as shown with U.S. Pat. No. 5,758,021 Hackbarth, Heidi (Korntal-Munchingen, D E) where the inventor teaches a system of having a word dictionary available that is loaded into the neural net on demand as needed and an additional on demand training method for words that are not included in the available dictionary.

There are many examples that can be cited using neural nets for speech recognition however the models have been consistent to use a single neural net with multiple training models applied meaning that a single neural net is used for all words versus multiple dedicated neural nets with a single training model perminately applied for each and then using an array of neural networks for the purpose of large vocabulary speaker independent speech recognition system. In the case of the Single Binary Speech Engine described here, sample segments would be sub-events that equate to a word or a phrase for a single neural net that would reside in an array of neural nets.

The strengths of a neural network are the ability to do pattern recognition and parallel neural networks lend themselves as a potentially better method for parallel processing. Using the neural net model for a Single Binary Speech Engine can result in a more efficient way of speech recognition processing versus a serially approach typically used today for large vocabulary systems.

The common models for Neural Nets typically include a first stage of Dynamic Time Wrapping of the segmented audio signal and then a static or dynamic classification where the static method sees all of the input speech at once and the dynamic method sees only a small window of the speech similar to a window watch as the input speech signal goes by.

Alternatively, the model proposed here is an array of static models and each input (sub-event) is tested until a true state is encountered within the array. Sub-events are determined by the time space between words and sounds.

Using Integrated Circuits and Hardware Implementations for Single Binary Speech Engines In the 1990's hardware implement for neural networks was being researched and resulted in the IBM Zero Instruction Set Computer (ZISC) that included 36 neurons. More recently the CM1K chip, a product of CogniMem Ltd (Hong Kong) includes 1024 neurons. Axeon in Scotland is another example of a company developing integrated circuits that include neural networks.

A hardware design of the Binary Speech Engine model would result in an array of neural nets within single or multiple IC's.

It's common for an IC that contains neural nets to parallel process multiple networks simultaneously. A single IC may contain many Single Binary Speech Engines or viewed in another way, would contain a percentage of the overall Binary Speech Engine array dictionary/vocabulary.

Using a hardware based neural network provides significant advantages in speed.

Pattern Recognition Software

There are other software tools that are available for the specific purpose of pattern recognition. Some of these tools include programming languages that could allow development of Single Binary Speech Engines. Examples of pattern recognition software include GAUSS which is a matrix programming language, IDL and the GNU data language, and Lush, an object-oriented dialect of the Lisp programming language that was initially developed as a scripting language for machine learning applications.

There are various ways to characterize the present invention. Some of them are as follows:

1. A sound input system to capture human speech where the speech is converted from an analog to a digital audio stream where the digital audio stream provides input to a divider that divides the audio stream into segments called sub-events where each sub-event is the sound between two variable time spaces of no sound.
2. A library of sub-events from Paragraph 1 created from human speech samples 3. A pattern recognition and/or Hidden Marchov Model function and a comparator function that are associated with each sub-event from Paragraph 2
4. A Binary Speech Recognition Processor function that contains an audio input, pattern recognition, comparator, and decision functions that are associated with a sub-event from Paragraph 2 that provides a binary output function of true or false.
5. A library of Binary Speech Recognition Processors from Paragraph 4 each used for identifying a non-library sub-event with one of the sub-events contained in the library of sub-events from Paragraph 2.
6. A control process that divides an audio stream into indexed or non-indexed sub-events provided as input to a library of Binary Speech Recognition Processors that identify each sub-event as a word resulting in a binary condition of true or false where the control process outputs the text word into a file or to a visual display or print medium.
7. A Large Vocabulary Speech Recognition system based on Binary Speech Recognition processors.
8. An optional grammatical and vocabulary process that reduces the number of Binary Speech Recognition processors that need to conduct processing based on a prediction of the next likely set of expected words of a sentence or paragraph.
9. A Large Vocabulary Speech Recognition system based on Binary Speech Recognition processors that can parallel process a plurality of separate audio inputs simultaneously.
10. A Large Vocabulary Speech Recognition system based on Binary Speech Recognition processors that can parallel process a plurality of separate audio inputs simultaneously that can provide output to displays, files, networks, and print mediums.
11. A Large Vocabulary Speech Recognition system based on Binary Speech Recognition processors that can serially process a single audio input that can provide output to displays, files, networks, and print mediums.

A BRIEF DESCRIPTION OF THE SEVERAL VIEWS OF THE DRAWINGS

FIG. 1 is a schematic representation of a system for large vocabulary speech recognition, employing a single binary speech engine and embodying the principles of the present invention, and FIG. 2 is a schematic representation of a system for large vocabulary speech recognition, employing a plurality of single binary speech engines and embodying the principles of the present invention.

FIG. 3 is a diagrammatic representation of Binary Speech Engine Arrays embodying the principles of the present invention.

FIG. 4 is a diagrammatic representation of an Output to Text Document embodying the principles of the present invention.

FIG. 5 is a diagrammatic representation of a Divider Function embodying the principles of the present invention.

FIG. 6 is a diagrammatic representation of a Divider Sub Event Segmentation embodying the principles of the present invention.

FIG. 7 is a diagrammatic representation of a Alternative Divider Function embodying the principles of the present invention.

DETAILED DESCRIPTION

I have further described the Binary Speech Engine in the areas of Binary Speech Engine Arrays, the Divider Function from FIG. 2, and Sub Event Segmentation and how the Sub Events are joined to make up the words to be transcribed. I have now also shown the block for the Language Model. Continuation for the Binary Speech Engine
Single Binary Speech Engine—FIG. 1

Referring back to FIG. 1, a Single Binary Speech Engine's purpose is to recognize a single word of audio data and transcribe that word to text based on the true or false decision.

The components of a Single Binary Speech Engine include:
A single word or phrase audio stream input (100)
A single word vocabulary (102)
Speech Recognition function (105)
Comparator (104)
Sub-Event Writer (107)

The audio stream (100) contains a single word or phrase to be recognized by the Speech Recognition Function (105). The Comparator (104) compares the single word from the audio stream with the previously trained single word vocabulary (102) and makes a true or false decision if the single word or phrase audio stream (100) matches the single word vocabulary (102). If it's a decision of true, the word is output to a document or display.
The Trained Single Word Vocabulary It's possible that the SBSE could be trained with multiple pronunciations of the same word, but in the end Single Binary Speech Engine's purpose is to recognize a single word of audio data and transcribe that word to text based. Separate BSE could be used with different pronunciations of the same word to accomplish the same task. However some IC's available in the market today have the ability to recognize 10 words. These IC's could be programmed to recognize the same word with separate and unique pronunciations to output the recognized word. Combining a very large number of these separate IC's could create a Large Vocabulary Binary Speech Engine capable of transcribing dictation into text documents.
Unrecognized Words If a word is not recognized then a place holder like "unrecognized word"<UW> could be placed in the text document.
Binary Speech Engine Arrays—FIG. 3

A group of BSE's is a Binary Speech Engine Array (BSEA) or a Speech Recognition Vocabulary (SRV). The purpose of having multiple arrays is to increase transcription speed.

Referring to FIG. 3, there are 3 arrays of Binary Speech Engines 300, 301, and 302. A single Binary Speech Engine is identified as an example in Binary Speech Engine 1 Array (314), which contains the components as is shown in FIG. 1. FIG. 3 shows how the audio data flows through the system to become a text word. The Audio Stream of spoken words enters a Divider function (304) where individual words or phrases are separated from the entire spoke audio stream. The separated words continue on to an array of Binary Speech Engines as can be seen that Word 1 (305 and 308) is provided to all the binary speech engines in Binary Speech Engine (BSE) 1 Array (300). Items 305 and 308 are the same, just shown as output of the divider stage and input as the recognition stage. In this example there are 3 Binary Speech Engine Arrays BSE 1 (300), BSE 2 (301) and BSE 3 (302). As the separate audio words are output from the divider (305, 306, and 307 in this example) they are parallel processed in separate BSE arrays to increase processing speed through parallelism. Parallel processing is not required, but shown here as a possibility.

Output to Text Document—FIG. 4

The output words of the arrays of BSE (400, 401, and 402) are either sent directly to an electronic text document (404) or to a grammatical check or language model check (405) and then to the text document (404). The grammatical check or language model alternatively could also be done after the text words are in the document with grammatical modifications done as a prost process when the speech recognition has completed.

Divider Function—FIG. 5

The purpose of the Divider Function (500) is to break up an audio stream into audio sub events or audio words and it accomplishes this by using the following components:
1) Interval Divider (501)
2) Sound Level Threshold Detection (502)
3) Audio Tag Marker and Control (503, 504, and 509)
4) Segment memory buffer to store audio segments or sub events (505)
5) Audio Word output to be transcribed (506 and 507)

In a general sense the audio is divided into segments, the segments are examined for volume or power threshold levels, and tagged if the threshold falls below a certain level with the first tag mark as Beginning of Sub Event Segment (BOS) and the following threshold level that falls below a certain level as the End of Sub Event Segment (EOS). The threshold levels are audio dependent although if a preprocessing step was included to normalize the audio then using standardized levels is possible.

Referring to FIG. 5, the entire audio stream (508) is input into the divider function first at the Audio Divider (501). The audio divider is responsible for initially dividing the audio into intervals for additional processing. In this example the audio is initially divided into 10 millisecond segments, but using other intervals including variable intervals could also be done based on final results to correctly identify word boundaries that is further down the process.

After the audio is divided into intervals (501) then the intervals are put through a Sound Level Threshold Detection (502) decision to identify if this audio segment is the beginning or the end of a word or phrase. If the threshold is not below the set threshold level the audio segment is simply stores in the audio buffer with a reference like a time index or count for example. The index is to reconstruct the audio later in the process.

If the audio segment threshold is below the set Sound Level trigger level, and if this is the first time the threshold is triggered, the audio segment is tagged as BOS (510) and the Audio Tag Marker Control (504) is set to BOS=True.

Then additional audio segments that do not fall below the Sound Level threshold continued to be stored in the segment buffer. When the next audio segment threshold is below the set Sound Level trigger level the Audio Tag Marker Control (504) is checked for BOS=True. If BOS=True then this is not Begin of Sub Event (BOS) (512) and the process continues on to Tag Segment as EOS (511) and then the Audio Sub Event (i.e. the audio with a word) is created and send to the Binary Speech Engine Array to be transcribed. The Clear BOS Audio Tag Marker Control is cleared allowing the next low level threshold trigger to be classified as BOS again.

Divider Sub Event Segmentation—FIG. 6

FIG. 6 illustrates a closer look into the Divider where an audio WAV file that contains the spoken audio word "The actual buyer". The audio can be seen as a time frequency graph (601). Below the graph are the words that correspond to the words in the graph of the audio (603), (604), and (605). The vertical bars indicate the 10 millisecond segmentation used in this example (606). The 2 horizontal bars indicate the Sound Level Threshold (602). Once the sound level drops below (between) the vertical bars the BOS (615) and EOS (616) tags are used to identify a Sub Event Word created as multiple segments (609, 610, 611, and 612, etc.) from the Time Divider (608) as shown in a linear representation at the bottom of FIG. 6. In this illustration not all there are 8 additional segments shown but are not labeled.

Alternative Divider Function—FIG. 7

In this case the Binary Speech Engines are used to identify the word and the same word will continue to be recognized for iterations until eventually the audio for the word trails off as a new recognized word will come into view for iterations as the intervals are incremented.

Referring to FIG. 7, the audio stream (701) is input to the Audio Divider (702) with 1 millisecond intervals for example. However in this case the following steps would be taken:
1) Initially the audio is selected at time zero of audio stream
2) A predetermined duration is set as a full audio sample (e.g. 3 seconds) (703 and 704)
3) Feed audio sample to all speech engines in parallel (705 and 710)
5) Capture all Binary Speech Engines that have a true condition (707)
6) Index the recognized word to full audio using a timestamp or some other method (708 and (709)
7) Advance audio stream to time zero plus small interval (Example ~1 millisecond) (702)
8) Repeat steps 3 through 7 above (706) until end of audio file.

The invention claimed is:

1. A large vocabulary speech recognition system, comprised of:
   a) a digital computer consisting of an input unit, a divider unit, a plurality of binary speech recognition processor units, a presenter unit and an assembler unit,
   b) a stream of audio words or phrases in a time order presented to the input unit,
   c) the divider unit, adapted to divide the stream of audio words or phrases into individual audio sub-events, the content of each sub-event consisting of a word or a phrase,
   d) the plurality of binary speech recognition processor units, each said processor unit being adapted to accept an individual audio sub-event and output a single text representing the content of the individual audio sub-event, if and only if the processor recognizes that the content of the individual audio sub-event accepted is content specifically assigned to that processor, and if the content of the individual audio sub-event accepted is not content specifically assigned to that processor, the processor does not output a text,
   e) the presenter unit adapted to take the content of each individual audio sub-event from the divider unit, and present it simultaneously to each of the plurality of binary speech recognition processor units for input and for processing by that binary speech recognition processor unit to which the individual audio sub-event is assigned
   f) the assembler unit adapted to gather text which is output by the binary speech recognition processor units and assemble that text into a stream of text having the same time order as the stream of audio words or phrases.

2. The large vocabulary speech recognition system, as recited in claim 1, wherein the content of each individual audio sub-event is a phrase.

3. The large vocabulary speech recognition system, as recited in claim 1, wherein at least one of the binary speech recognition processor units is adapted to recognize multiple pronunciations of the word or phrase within the content of the audio sub-event.

4. The large vocabulary speech recognition system, as recited in claim 1, wherein at least one of the binary speech recognition processor units is adapted to recognize several words or phrases within the content of the audio sub-event.

5. The large vocabulary speech recognition system, as recited in claim 1, wherein at least one of the binary speech recognition processor units is adapted to recognize more than one and at most five words or phrases within the content of the audio sub-event.

6. The large vocabulary speech recognition system, as recited in claim 1, wherein at least one of the binary speech recognition processor units is adapted to recognize more than one and at most four words or phrases within the content of the audio sub-event.

7. The large vocabulary speech recognition system, as recited in claim 1, wherein at least one of the binary speech recognition processor units is adapted to recognize more than one and at most three words or phrases within the content of the audio sub-event.

8. The large vocabulary speech recognition system, as recited in claim 1, wherein at least one of the binary speech recognition processor units is adapted to recognize more than one and at most two words or phrases within the content of the audio sub-event.

9. A method for achieving large vocabulary speech recognition, comprising the steps of:
   a) inputting a stream of audio words or phrases in a time order,
   b) dividing the stream of audio words or phrases into individual audio sub-events, the contents of each sub-event consisting of a word or a phrase,
   c) presenting each audio sub-event simultaneously to a plurality of electronic binary speech recognition processors for processing, each said processor being adapted to accept an individual audio sub-event, and output a text representing the content of the audio sub-event, if and only if the processor recognizes that the content of the audio sub-event accepted is content specifically assigned to that processor, and if the content of the audio sub-event accepted is not content specifically assigned to that processor, the processor does not output a text,
   d) gathering the text from the binary speech processors and assembling the text into a stream of text having the same time order as the stream of audio words or phrases.

10. The method for achieving large vocabulary speech recognition, as recited in claim 9, wherein the content of each individual audio sub-event is a phrase.

11. The method for achieving large vocabulary speech recognition, as recited in claim 9, wherein at least one of the binary speech recognition processors is adapted to recognize multiple pronunciations of a word or phrase within the content of the accepted audio sub-event.

12. The method for achieving large vocabulary speech recognition, as recited in claim 9, wherein at least one of the binary speech recognition processors is adapted to recognize several words or phrases within the content of the accepted audio sub-event.

13. The method for achieving large vocabulary speech recognition, as recited in claim 9, wherein at least one of the binary speech recognition processors is adapted to recognize more than one and at most five words or phrases within the content of the accepted audio sub-event.

14. The method for achieving large vocabulary speech recognition, as recited in claim 9, wherein at least one of the binary speech recognition processors is adapted to recognize more than one and at most four words or phrases within the content of the accepted audio sub-event.

15. The method for achieving large vocabulary speech recognition, as recited in claim 9, wherein at least one of the binary speech recognition processors is adapted to recognize more than one and at most three words or phrases within the content of the accepted audio sub-event.

16. The method for achieving large vocabulary speech recognition, as recited in claim 9, wherein at least one of the binary speech recognition processors is adapted to recognize more than one and at most two words or phrases within the content of the accepted audio sub-event.

17. A large vocabulary speech recognition system, comprised of:
   a) a digital computer consisting of an input unit, a divider unit, a plurality of binary speech recognition processor units, a presenter unit and an assembler unit,
   b) a stream of audio words or phrases in a time order presented to the input unit,
   c) the divider unit, adapted to divide the stream of audio words or phrases into individual audio sub-events, the content of each sub-event consisting of a word or a phrase,
   d) the plurality of binary speech recognition processor units, each said processor unit being adapted to accept an individual audio sub-event and output a single text representing the content of the audio sub-event, if and only if the processor unit recognizes that the content of the audio sub-event accepted is content specifically assigned to that processor unit, wherein at least one of the binary speech recognition processor units is adapted to recognize multiple pronunciations of a word or phrase within the content of the audio sub-event and wherein at least one of the binary speech recognition processor units is adapted to recognize several words or phrases within the content of the audio sub-event and if the content of the audio sub-event accepted is not content specifically assigned to that processor unit, the processor unit does not output a text,
   e) the presenter unit adapted to take the content of each individual audio sub-event from the divider unit, and present it simultaneously to each of the plurality of binary speech recognition processor units for input and for processing by that binary speech recognition processor unit to which the individual audio sub-event is assigned,
   f) an assembler adapted to gather text which is output by the binary speech recognition processor units and assemble that text into a stream of text having the same time order as the stream of audio words or phrases.

* * * * *